(12) United States Patent
Mueller et al.

(10) Patent No.: US 10,187,253 B1
(45) Date of Patent: Jan. 22, 2019

(54) SYSTEM AND METHOD FOR NETWORK PROVISIONING USING BULK ORDERING

(71) Applicant: CSG Media, LLC, Chicago, IL (US)

(72) Inventors: Michael Mueller, Tinley Park, IL (US); Doug Savage, Gibsons (CA); Vipin Verma, Bengaluru (IN)

(73) Assignee: CSG Media, LLC, Chicago, IL (US)

( * ) Notice: Subject to any disclaimer, the term of this patent is extended or adjusted under 35 U.S.C. 154(b) by 0 days.

(21) Appl. No.: 16/057,913

(22) Filed: Aug. 8, 2018

(51) Int. Cl.
*H04L 12/24* (2006.01)
*G06Q 30/04* (2012.01)
*H04W 8/18* (2009.01)
*H04L 29/08* (2006.01)
*H04L 12/28* (2006.01)

(52) U.S. Cl.
CPC ......... *H04L 41/0806* (2013.01); *G06Q 30/04* (2013.01); *H04L 12/2803* (2013.01); *H04L 67/12* (2013.01); *H04L 67/125* (2013.01); *H04W 8/18* (2013.01)

(58) Field of Classification Search
CPC ..... H04L 41/0806; H04L 67/12; H04L 47/70; H04L 47/72; H04L 47/74; H04L 47/741; H04L 47/781; H04L 65/40; H04L 65/4038; H04L 65/4061; H04L 12/2803; H04L 12/2807; H04L 12/2821; H04L 12/2823; H04L 12/283; H04L 12/2838; H04L 2012/2841; H04L 2012/2843; H04L 2012/285; G06Q 30/04; H04W 8/18; H04W 4/06; H04W 4/08; H04W 4/10; H04W 76/005
See application file for complete search history.

(56) References Cited

U.S. PATENT DOCUMENTS

| | | | | |
|---|---|---|---|---|
| 8,391,161 B1* | 3/2013 | Poon | ...................... | H04W 24/00 370/242 |
| 8,767,630 B1* | 7/2014 | Collins | ................... | H04L 43/00 370/328 |
| 9,900,172 B2* | 2/2018 | Goel | ....................... | H04W 4/70 |
| 2016/0277530 A1* | 9/2016 | Jung | ....................... | H04W 4/70 |
| 2017/0083368 A1* | 3/2017 | Bishop | .................... | G06F 9/505 |
| 2017/0083396 A1* | 3/2017 | Bishop | .................... | G06F 11/14 |
| 2018/0019929 A1* | 1/2018 | Chen | ...................... | H04L 41/145 |
| 2018/0316563 A1* | 11/2018 | Kumar | ................. | H04L 41/0893 |
| 2018/0331916 A1* | 11/2018 | Damaggio | ............. | H04L 67/12 |
| 2018/0332452 A1* | 11/2018 | Goluboff | ............... | H04L 63/083 |

\* cited by examiner

*Primary Examiner* — Mounir Moutaouakil
(74) *Attorney, Agent, or Firm* — Fitch, Even, Tabin & Flannery LLP

(57) ABSTRACT

A system that is configured to automatically provision electronic communication networks and invoice customers. Control signals provision usage of all IoT devices listed in the validated electronic data structure at an electronic communication network. The system is configured to subsequently reconcile the subscriber usage information and the identification information to form an electronic invoice. The validation of the data structure, provisioning of the electronic communication network, and reconciling are performed at least in part by accessing the electronic memory device according to a batch mode of operation that accesses information of multiple IoT devices via a single electronic operation.

20 Claims, 6 Drawing Sheets

SYSTEM AND METHOD FOR NETWORK PROVISIONING USING BULK ORDERING

TECHNICAL FIELD

This disclosure relates to provisioning electronic networks and/or billing systems based upon bulk ordering.

BACKGROUND

Various types of products or services can be purchased in different ways. For example, different products can be purchased over the internet. One type of electronic product that can be purchased is a wireless device such as a smartphone. Often, the purchaser of the device also wishes to subscribe to a service plan, which they will purchase as well.

When an electronic device is to be added to a network, various steps need to be taken to allow the device to operate in the network. For example, the network must be provisioned to recognize the device. Billing arrangements must also be made so that the user of the device is billed for the services provided by the network.

In previous systems, the various steps mentioned above occurred at various locations and used multiple devices or processes. Multiple databases had to be maintained.

BRIEF DESCRIPTION OF THE DRAWINGS

For a more complete understanding of the disclosure, reference should be made to the following detailed description and accompanying drawings wherein.

DETAILED DESCRIPTION

Figure 1:
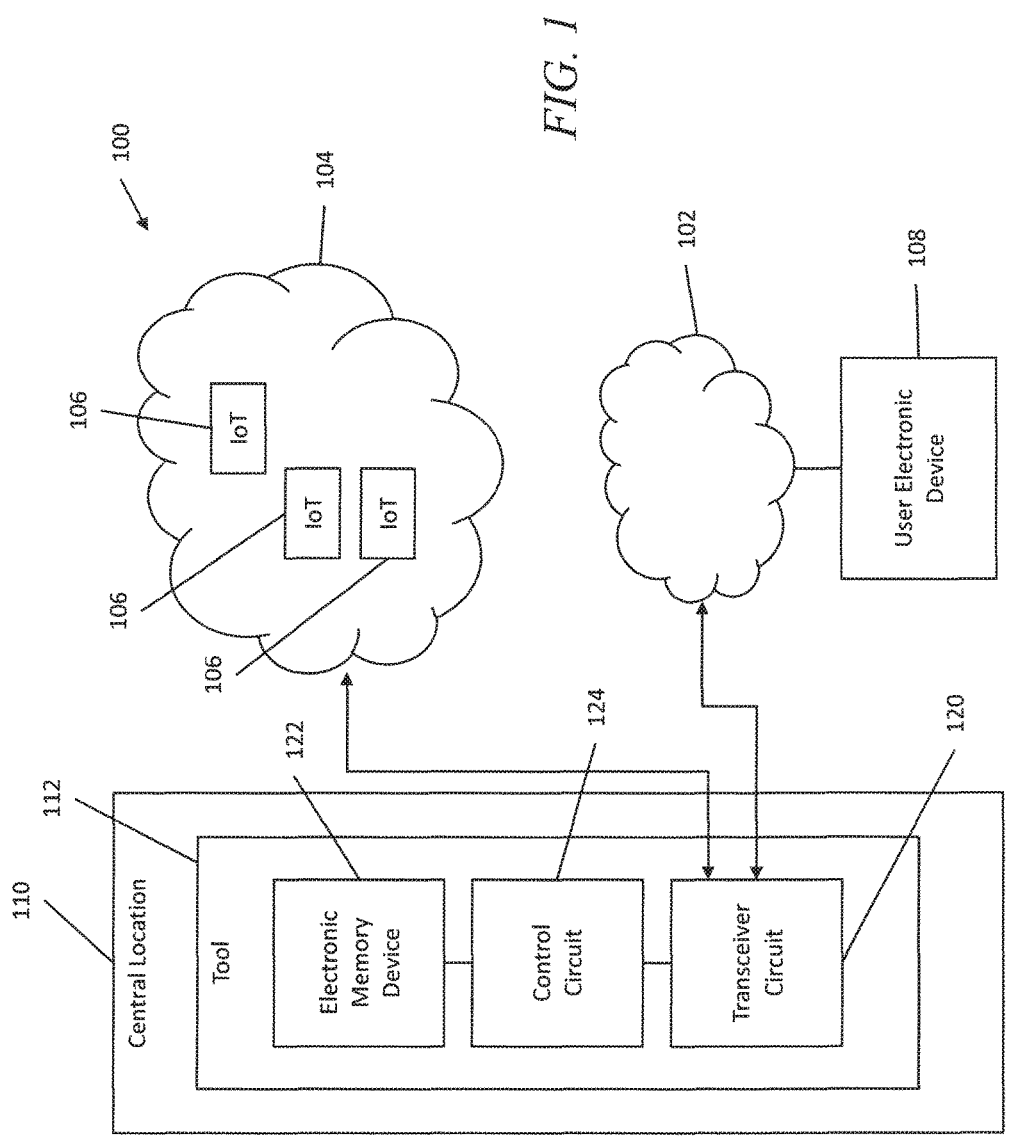
FIG. 1 comprises a diagram of a system as configured in accordance with various embodiments of these teachings.

Generally speaking, approaches are provided that allow large groups of IoT devices to be provisioned into a network and the activities of these IoT devices automatically invoiced to customers with minimal customer involvement. A customer can perform other activities while provisioning and invoicing activities are performed. Since the provisioning and invoicing of these activities is accomplished using a batch mode of operation, these results are achieved more quickly and efficiently as compared to previous approaches.

A single centralized system is provided that handles provisioning and billing. Because of the centralized architecture, the remote user can perform other tasks at the same time (in parallel) with the validation, provisioning, and invoicing activities. All the user has to do is enter the list of devices.

The batch mode of operation ensures that groups of IoT devices are processed at the same time or nearly the same time. In other words, a sequential accessing using multiple operations (e.g., memory read and write) is not performed. Instead, a single operation that accesses information for multiple IoT devices can be utilized. For instance, information relating to a group of IoT devices is accessed and information for all these devices is retrieved at once from a memory device rather than performing multiple individual read operations. Thus, the retrieved information can be sent to a network provider at the same time. This information can also be used in the network to provision the network for all devices in parallel. This particular feature allows for much quicker network operation and efficient system operation.

In many of these embodiments, a system that is configured to automatically provision electronic communication networks and invoice customers, includes a first electronic communication network, a second electronic communication network, a plurality of Internet of Things (IoT) devices, a user electronic device, a transceiver circuit, an electronic memory device, and a control circuit.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit may be configured (for example, by using corresponding programming stored in a memory as will be well understood by those skilled in the art) to carry out one or more of the steps, actions, and/or functions described herein.

The plurality of IoT devices are configurable to be operated within the second electronic communication network. Each of the IoT devices includes a sensor and the sensor is configured to gather sensed information.

The user electronic device is coupled to the first electronic communication network and located remotely from a central location. The transceiver circuit is disposed at the central location and is configured to receive an electronic data structure from the user electronic device via the first electronic communication network. The electronic data structure is an organized list including the plurality of IoT devices operating in an electronic communication network. Each of the IoT devices on the list has an identifier.

The electronic memory device is disposed at the central location and is configured to store the electronic data structure. The control circuit is disposed at the central location, the control circuit configured to validate contents of the electronic data structure to transform the electronic data structure into a validated electronic data structure. The control circuit is also configured to, upon completion of the validation, immediately and in real-time inform a user of the success or failure of the validation by transmitting a first electronic message from the transceiver circuit to the user electronic device via the first electronic communication network.

The control circuit is further configured to subsequently transmit electronic control signals from the transceiver circuit to the second electronic communication network. The control signals provision usage of all the IoT devices listed in the validated electronic data structure at the second electronic communication network. The control circuit is configured to receive an acknowledgment signal from the second electronic communication network indicating success or failure of the provisioning. Upon receiving the acknowledgment signal, the control circuit is configured to immediately and in real-time inform the user of the success or failure of the provisioning by transmitting a second electronic message from the transceiver circuit to the user electronic device.

The second electronic communication network is configured to collect subscriber usage information. The subscriber usage information describes electronic communications made by subscribers operating in or using the second electronic communication network using the IoT devices. The transceiver circuit is configured to receive and store the subscriber usage information in the electronic memory device. The control circuit is configured to subsequently reconcile the subscriber usage information and the identification information to form an electronic invoice. The validation of the data structure, provisioning of the second electronic communication network, and reconciling are performed at least in part by accessing the electronic memory device according to a batch mode of operation that accesses information of multiple IoT devices via a single electronic operation.

In aspects, the identifier is an IP address, a MAC address, or an alphanumeric identifier. Other examples are possible.

In other examples, at least some of the IoT devices comprise a subscriber identification module (SIM) card in a mobile electronic device. Other types of electronic components may be also deployed at the IoT devices.

In some examples, the first electronic communication network and the second electronic communication network comprises a wireless network or the internet. Other examples of networks and combinations of networks are possible.

In examples, the data structure comprises an organized spreadsheet. In aspects, the spreadsheet is downloaded to the user by the control circuit and the user fills in the spreadsheet with the list of the plurality IoT devices.

In others of these embodiments, an electronic tool is configured to automatically provision electronic communication networks and invoice customers. The electronic tool includes a transceiver circuit, an electronic memory device, and a control circuit.

The transceiver circuit is disposed at a central location and is configured to receive an electronic data structure from a user electronic device via a first electronic communication network. The user electronic device is coupled to the first electronic communication network and located remotely from the central location. The electronic data structure is an organized list of a plurality of Internet of Things (IoT) devices operating in an electronic communication network. Each of the IoT devices on the list has an identifier.

The electronic memory device is disposed at the central location and configured to store the electronic data structure. The control circuit is also disposed at the central location. The control circuit is configured to validate contents of the electronic data structure and transform the electronic data structure into a validated electronic data structure.

Upon completion of the validation, the control circuit is configured to immediately and in real-time inform a user of the success or failure of the validation by transmitting a first electronic message from the transceiver circuit to the user electronic device via the first electronic communication network. The control circuit is configured to subsequently transmit electronic control signals from the transceiver circuit to a second electronic communication network, the control signals provisioning usage of all the IoT devices listed in the validated electronic data structure at the second electronic communication network. The control circuit is configured to receive an acknowledgment signal from the second electronic communication network indicating success or failure of the provisioning.

Upon receiving the acknowledgment signal, the control circuit is configured to immediately and in real-time inform the user of the success or failure of the provisioning by transmitting a second electronic message from the transceiver circuit to the user electronic device. The second electronic communication network is configured to collect subscriber usage information, the subscriber usage information describing electronic communications made by subscribers operating in or using the second electronic communication network using the IoT devices.

The transceiver circuit is configured to receive and store the subscriber usage information in the electronic memory device. The control circuit is configured to subsequently reconcile the subscriber usage information and the identification information to form an electronic invoice. The validation of the data structure, provisioning of the second electronic communication network, and reconciling are performed at least in part by accessing the electronic memory device according to a batch mode of operation that accesses information of multiple IoT devices via a single electronic operation.

In still others of these embodiments, an approach for automatically provisioning an electronic communication network and invoicing customers is provided. At a central location, an electronic data structure is received. The electronic data structure is an organized list including a plurality of Internet of Things (IoT) devices operating in an electronic communication network. Each of the IoT devices on the list has an identifier.

The electronic data structure is stored in an electronic memory device at the central location. At the central location, contents of the electronic data structure are validated to transform the electronic data structure into a validated electronic data structure.

Upon completion of the validating, a user is immediately and in real-time informed of the success or failure of the validating by transmitting a first electronic message from the central location to a user electronic interface located remotely from the central location. From the central location, electronic control signals are subsequently transmitted to the electronic communication network. The control signals provision usage of all the IoT devices listed in the validated electronic data structure at the electronic communication network. An acknowledgment signal is received from the electronic communication network indicating success or failure of the provisioning.

Upon receiving the acknowledgment signal, the user is immediately and in real-time informed of the success or failure of the provisioning by transmitting a second electronic message for the central location to the user device. Subscriber usage information is collected at the electronic communication network. The subscriber usage information describes electronic communications made by the subscribers operating in or using the electronic communication network using the IoT devices.

The subscriber usage information is received and stored in the electronic memory device at the central location. At the central location, the subscriber usage information is subsequently reconciled with the identification information to form an electronic invoice. The validating, provisioning, and reconciling are performed at least in part by accessing the electronic memory device according to a batch mode of operation that accesses information of multiple IoT devices via a single electronic operation.

Referring now to FIG. 1, one example of a system 100 for automatically provisioning electronic communication networks and invoicing customers is described. The system 100 includes a first electronic communication network 102, a second electronic communication network 104, a plurality of Internet of Things (IoT) devices 106 configurable to be operated within the second electronic communication network 104, a user electronic device 108 (coupled to the first electronic communication network 102 and located remotely from a central location 110), and a tool 112 that is disposed at the central location 110. The tool 112 includes a transceiver circuit 120, a database 122, and a control circuit 124. The central location 110 may be a location such as a headquarters, a company home office, or any location that is accessible by multiple users.

The first electronic communication network 102 and the second electronic communication network 104 are any type of electronic communication networks such as the internet, wireless networks, wide area networks, local area networks, cellular networks, or combinations of these or other networks. In one example, the first electronic communication network 102 comprises the internet and the second electronic communication network 104 is a wireless communication network. Other examples are possible.

Each of the IoT devices 106 includes a sensor. The sensor is configured to gather, obtain, or collect information. In one example, the sensor is a camera and gathers video images. In another example, the sensor is a temperature sensor and gathers weather information.

The IoT devices 106 may be any (or any combination) of electronic devices such as smartphones, cellular phones, personal computers, laptops, tablets, appliances (of any type such as kitchen appliances), to mention a few examples. In other examples, at least some of the IoT devices 106 comprise a subscriber identification module (SIM) card in a mobile electronic device.

Information gathered by the IoT devices can be transmitted across the network 104 to the central location 110 where the information can be further transformed. For example, camera images obtained by any of the IoT device 106 can be further processed or transformed.

The user electronic device 108 includes an electronic display and is operated by a user (customer). The screen may be a touch screen or any type of screen that displays information. The user electronic device 108 is coupled to the first electronic communication network 102.

The transceiver circuit 120 is disposed at the tool 112, which itself is disposed at the central location 110. The transceiver circuit 120 is any type of electronic circuit that can transmit and receive information. The transceiver circuit 120 may include buffers, storage, transmitters, and receivers and may be implemented as any combination of computer software or electronic hardware.

The electronic memory device 122 is disposed at the tool 112 and is configured to store the electronic data structure. The electronic memory device 122 is any type of memory or data storage device that is configured to store information. In examples, the data structure comprises an organized spreadsheet. In aspects, the spreadsheet is downloaded to the user by the control circuit and the user fills in the spreadsheet with the list of the plurality IoT devices.

As mentioned, the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 124 may be configured (for example, by using corresponding programming stored in a memory as will be well understood by those skilled in the art) to carry out one or more of the steps, actions, and/or functions described herein.

The transceiver circuit 120 is configured to receive an electronic data structure from the user electronic device via the first electronic communication network, the electronic data structure is an organized list including the plurality of IoT devices operating in an electronic communication network. Each of the IoT devices on the list has an identifier. In aspects, the identifier is an IP address, a MAC address, or an alphanumeric identifier. Other examples are possible.

The data structure is organized in a particular way, as an organized list where separate entries on the list are associated with a different one of the IoT devices 106 and where these entries are separated on the list so as to be distinguishable from each other. For example, a list of identifiers for SIM cards is entered in a table. Each of the entries is on a different line or separated by specified characters such as commas or semicolons. The use of this particular data structure allows for a stream-lined validation and provisioning approach to be used since no further analysis is needed to identify entries. The use of this particular data structure also ensures the control circuits or processors described herein operate more quickly and efficiently than if random and unorganized information were included with the data structure.

The control circuit 124 is disposed at the central location and is configured to validate contents of the electronic data structure to transform the electronic data structure into a validated electronic data structure. It will be understood that a physical transformation is made to the electronic data structure. For example, duplicates or inaccurate entries are removed from the data structure. The validation process allows the system to operate efficiently and more quickly because inaccurate or duplicate entries need not be analyzed. The attempted provisioning of inaccurate or invalid entries also reduces or eliminates provisioning errors. For instance, with no invalid entries on the list, there is no chance an invalid device will be provisioned to operate within the network 104.

Upon completion of the validation, the control circuit 124 is configured to immediately and in real-time inform a user of the success or failure of the validation by transmitting a first electronic message from the transceiver circuit to the user electronic device 108 via the first electronic communication network 102. The first electronic message may include the results of the validation, and other information.

Subsequently, the control circuit 124 causes the transmission of electronic control signals from the transceiver circuit 120 to the second electronic communication network 104. The control signals provision usage of all the IoT devices 106 listed in the validated electronic data structure at the second electronic communication network 104. After the provisioning is complete (either successfully or unsuccessfully), an acknowledgment signal is sent from the second electronic communication network 104 indicating success or failure of the provisioning.

The network 104 and/or the IoT devices are physically transformed when provisioned. For example, information may be sent to the network 104 identifying the IoT devices 106. Provisioning can also include setting or altering the states of switches, routers, or other electronic network elements within the network 104.

In aspects, two networks are used: the first electronic communication network 102 and second electronic communication network 104. The first electronic communication network 102 is used to communicate with the tool. In examples, the second electronic communication network 104 is separate and distinct from the first network and is the network in which the IoT networks 106 are deployed.

Upon receiving the acknowledgment signal, the control circuit 124 is configured to immediately and in real-time inform the user of the success or failure of the provisioning by transmitting a second electronic message from the transceiver circuit 120 to the user electronic device 108. The second electronic message may include the results of the provisioning, and other information.

The second electronic communication network 104 is configured to collect subscriber usage information. The subscriber usage information describes electronic communications made by subscribers operating in or using the second electronic communication network using the IoT devices 106. The transceiver circuit 120 is configured to receive and store the subscriber usage information in the electronic memory device 122.

The validation of the data structure, provisioning of the second electronic communication network 104, and reconciling are performed at least in part by accessing the electronic memory device 122 according to a batch mode of operation that accesses information of multiple IoT devices via a single electronic operation. In the validation process, the entire spreadsheet is accessed from the electronic memory device 122 and this includes multiple IoT devices 106. The validation considers multiple IoT devices in one operation rather than performing individual validations for each device.

The provisioning process also accesses the entire validated spreadsheet (with multiple IoT devices 106) from the electronic memory device 122. Further, the spreadsheet (with multiple IoT devices 106) is sent to the network 104 and provisioning of the multiple IoT devices may be accomplished in one operation (e.g., in parallel) after which an acknowledgement of the success or failure of the group (including individual devices 106 in the group) is reported to the tool 112.

The control circuit 124 is configured to reconcile the subscriber usage information and the identification information to form an electronic invoice. Known subscriber identifiers are compared against the usage information to determine the services, data, time, or other parameter used by a customer. Once the identifiers are mapped to the usage information, billing amounts can be calculated, and the invoice created.

The reconciliation process considers multiple IoT devices 106. In aspects, identifiers can be obtained by retrieving the spreadsheet (with multiple IoT devices 106) from the electronic memory device 122. After retrieval, reconciliation between the retrieved identification information and subscriber usage information is made by considering multiple IoT devices 106 in a single process rather than each of the IoT devices 106 individually in multiple processes.

The batch mode of operation ensures that the entire system 100 operates more quickly and efficiently than in previous approaches. By reducing the number of memory access operations costs are also reduced.

The system of FIG. 1 stores multiple types of information at the central location (e.g., at the central tool 112 or server) rather than the information being distributed widely throughout the system. This architecture reduces system costs because multiple copies or instances of data do not need to be maintained at multiple locations.

The use of a centralized architecture is more cost-efficient and allows decisions to be made more quickly leading to greater system efficiency. For example, the network provider and the user would both be required to store similar types of information. If this were performed one-by-one for each IoT device (as currently is the practice) at a remote location, the remote user would have to reconcile their information to the network information to ensure configuration of the network and invoicing were properly handled.

Figure 2:
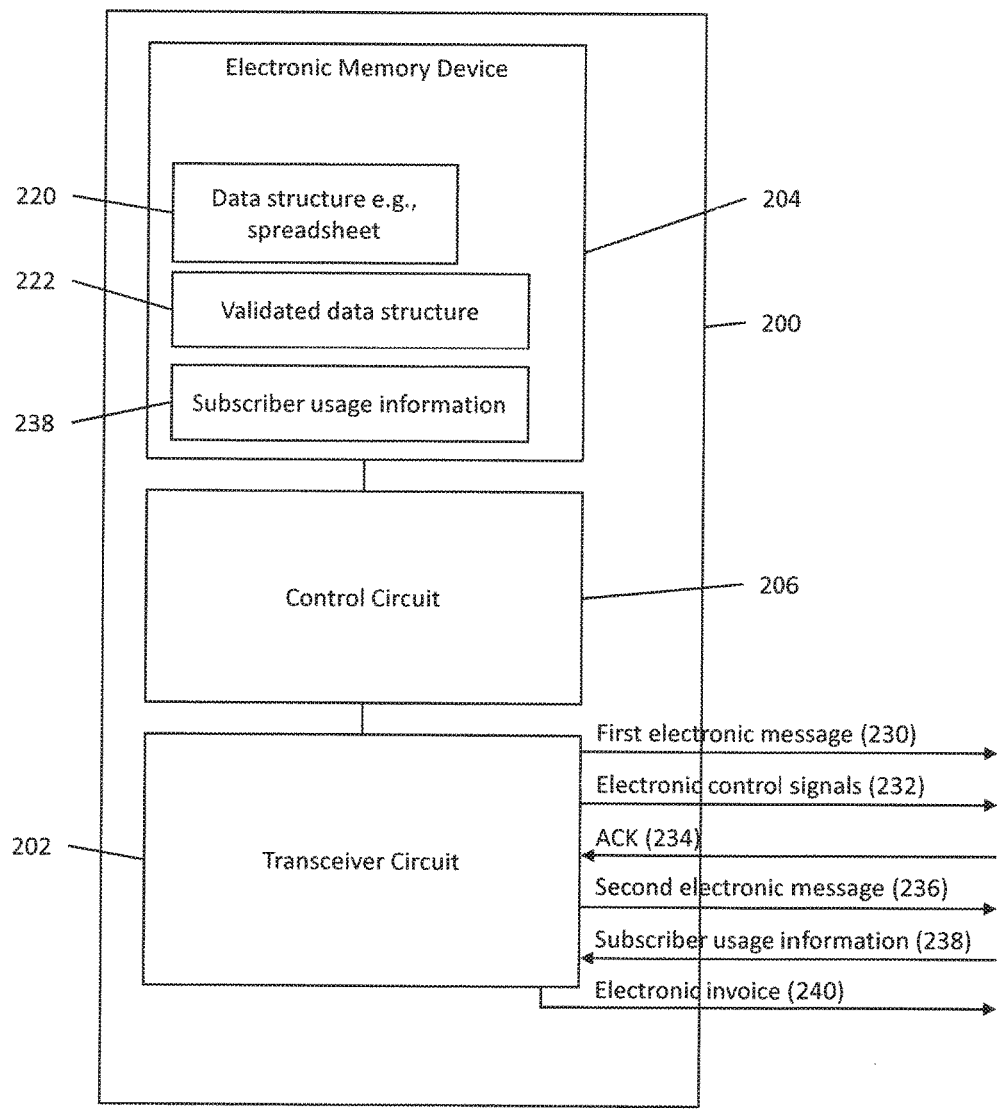
FIG. 2 comprises a flowchart as configured in accordance with various embodiments of these teachings.

Referring now to FIG. 2, an electronic tool 200 is configured to automatically provision electronic communication networks and invoice customers. The tool 200 includes a transceiver circuit 202, an electronic memory device 204, and a control circuit 206. It will be appreciated that one example of the tool 200 is the tool 112 described with respect to FIG. 1. Consequently, the description of the tool 112 and its operation in the system of FIG. 1 apply to the electronic tool 200.

The transceiver circuit 202 is disposed at a central location and is configured to receive an electronic data structure 220 from a user electronic device via a first electronic communication network. The user electronic device is coupled to the first electronic communication network and located remotely from the central location. The electronic data structure 220 is an organized list of a plurality of Internet of Things (IoT) devices operating in an electronic communication network. Each of the IoT devices on the list has an identifier.

The electronic memory device 204 is disposed at the central location and configured to store the electronic data structure 220. The control circuit 206 is disposed at the central location. The control circuit 206 is configured to validate contents of the electronic data structure 220 to transform the electronic data structure into a validated electronic data structure 222.

Upon completion of the validation, the control circuit 206 is configured to immediately and in real-time inform a user of the success or failure of the validation by transmitting a first electronic message 230 from the transceiver circuit 202 to the user electronic device via the first electronic communication network. The control circuit 206 is configured to subsequently transmit electronic control signals 232 from the transceiver circuit 202 to a second electronic communication network. The control signals provision usage of all the IoT devices listed in the validated electronic data structure at the second electronic communication network. The control circuit 206 is configured to receive an acknowledgment signal 234 from the second electronic communication network indicating success or failure of the provisioning.

Upon receiving the acknowledgment signal 234, the control circuit 206 is configured to immediately and in real-time inform the user of the success or failure of the provisioning by transmitting a second electronic message 236 from the transceiver circuit 202 to the user electronic device. The second electronic communication network is configured to collect subscriber usage information 238. The subscriber usage information 238 describes electronic communications made by subscribers operating in or using the second electronic communication network using the IoT devices.

The transceiver circuit 202 is configured to receive and store the subscriber usage information 238 in the electronic memory device 204. The control circuit 206 is configured to subsequently reconcile the subscriber usage information 238 and the identification information to form an electronic invoice 240.

The validation of the data structure, provisioning of the second electronic communication network, and reconciling are performed at least in part by accessing the electronic memory device according to a batch mode of operation that accesses information of multiple IoT devices via a single electronic operation. As described above with respect to FIG. 1, the batch mode of operation advantageously allows the system to operate faster and more efficiently.

Figure 3:
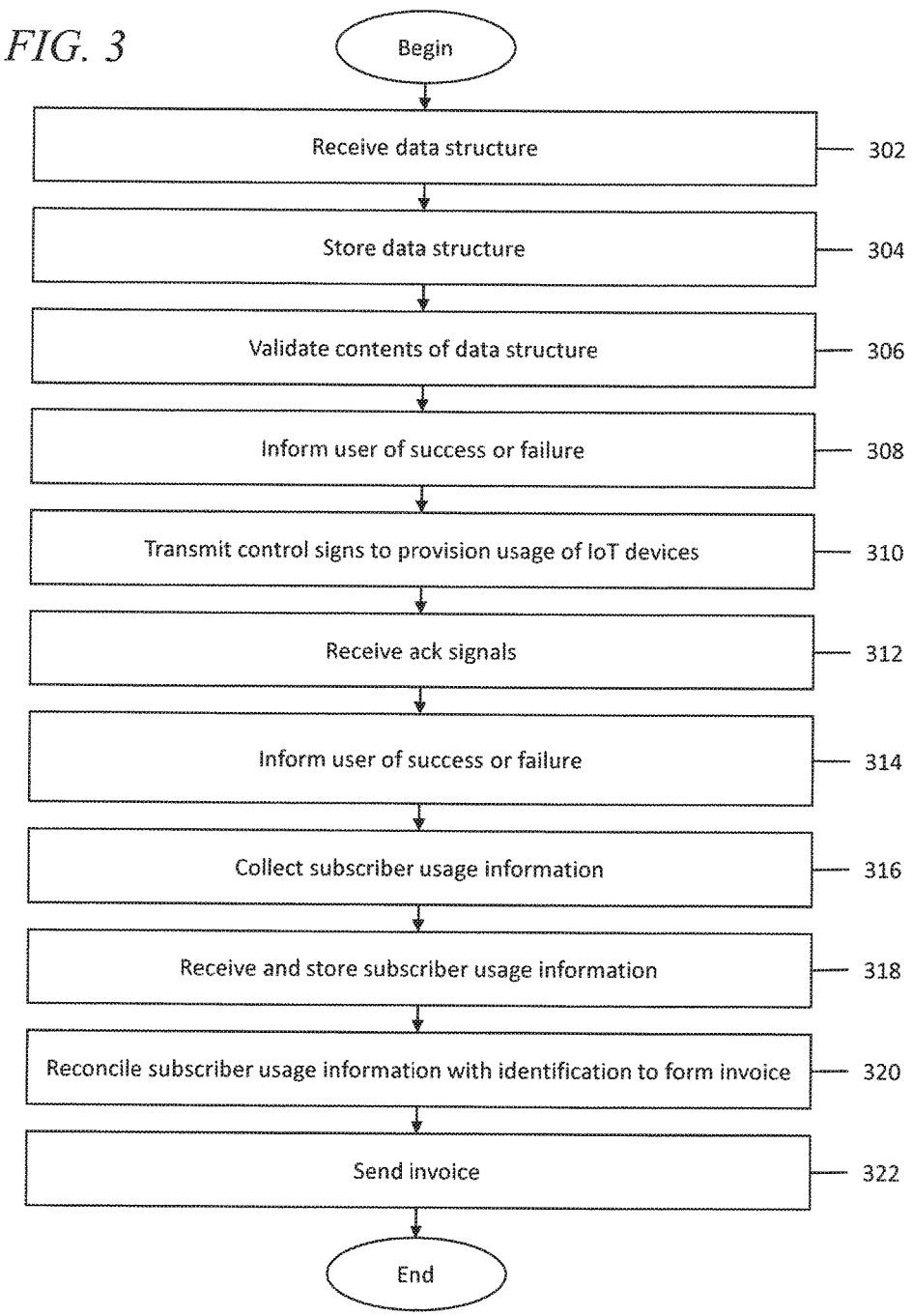
FIG. 3 comprises a flow diagram as configured in accordance with various embodiments of these teachings.

Referring now to FIG. 3, an approach for automatically provisioning an electronic communication network and invoicing customers is described. At step 302 and a central location, an electronic data structure is received. The electronic data structure is an organized list including a plurality of Internet of Things (IoT) devices operating in an electronic communication network. Each of the IoT devices on the list has an identifier.

At step 304, the electronic data structure is stored in an electronic memory device at the central location. At step 306 and at the central location, contents of the electronic data structure are validated to transform the electronic data structure into a validated electronic data structure.

At step 308 and upon completion of the validating, a user is immediately and in real-time informed of the success or failure of the validating by transmitting a first electronic message from the central location to a user electronic interface located remotely from the central location. At step 310 and from the central location, electronic control signals are subsequently transmitted to the electronic communication network. The control signals provision usage of all the IoT devices listed in the validated electronic data structure at the electronic communication network. At step 312, an acknowledgment signal is received from the electronic communication network indicating success or failure of the provisioning.

At step 314 and upon receiving the acknowledgment signal, the user is immediately and in real-time informed of the success or failure of the provisioning by transmitting a second electronic message for the central location to the user device. At step 316, subscriber usage information is collected at the electronic communication network. The subscriber usage information describes electronic communications made by the subscribers operating in or using the electronic communication network using the IoT devices.

At step 318, the subscriber usage information is received and stored in the electronic memory device at the central location. At step 320 and at the central location, the subscriber usage information is subsequently reconciled with the identification information to form an electronic invoice. At step 322, the invoice is sent to a customer. The validating, provisioning, and reconciling steps are performed at least in part by accessing the electronic memory device according to a batch mode of operation that accesses information of multiple IoT devices via a single electronic operation. Additionally, individual operations within these steps can occur in parallel (e.g., provisioning of multiple IoT devices can occur in parallel within the network).

Figure 4:
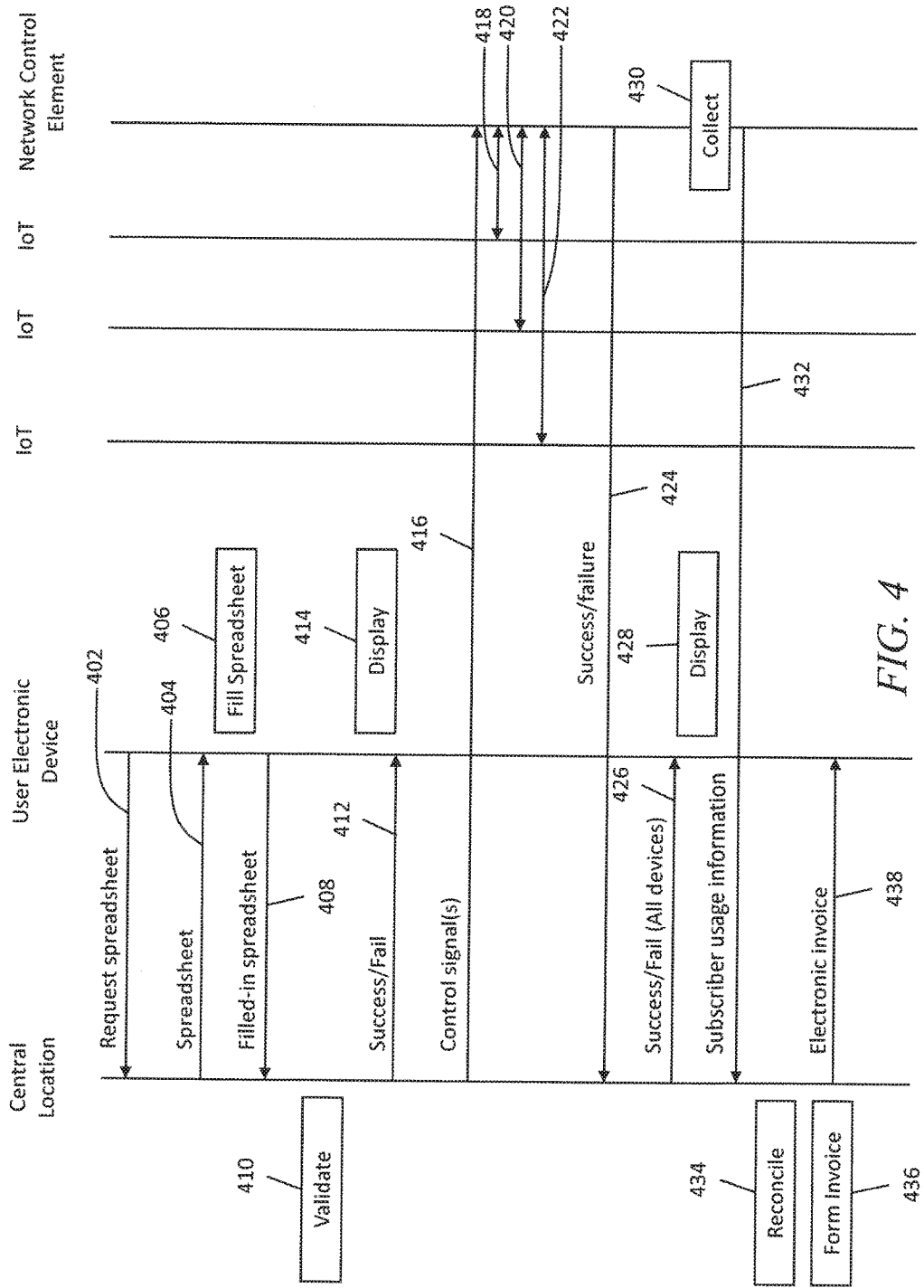
FIG. 4 comprises a flowchart as configured in accordance with various embodiments of these teachings.

Referring now to FIG. 4, one example of an approach for provisioning networks and invoicing customers is described. At step 402, a customer requests a spreadsheet. The request is made from a user electronic device.

The request is received at a central location. At step 404, the central location sends the spreadsheet to the user electronic device. At step 406, the customer fills in the spread sheet with information. The information includes identification information concerning IoT devices that are to be configured to operate in the electronic network.

At step 408, the filled-in spread sheet is sent to the central location. At step 410, the filled-in spread sheet is validated. Validation may include examining the spread sheet to determine duplicate entries or correcting typographical mistakes. The central location determines whether the validation process is a success or a failure (e.g., the spreadsheet was unreadable).

At step 412, indication of the success or failure of the validation process is sent to the customer at the user electronic device and, at step 414, information concerning the success or failure is displayed. It will be appreciated that the sending of the outcome of the verification occurs immediately or substantially immediately after success or failure is determined. More specifically, informing the user is not interrupted by other operations or processes that require substantial amounts of time. Although there will be a minimal lag time as information is transmitted across networks, there will be no substantial interruption of this information flow to the user electronic device.

At step 416, electronic control signal or signals are sent to one or more network control elements in the network. The purpose of the electronic control signals is to set up the network so that the IoT devices may operate within the network. In examples, the network control elements may be informed of the identities of the IoT devices so that it can establish connections with these devices. In other aspects, network elements (e.g., switches, routers, or gateways to mention a few examples) may be initialized or programmed to accommodate needs to the IoT devices. For instance, certain devices may need data service, others only voice service, and still others both data and voice service. It will be appreciated that the provisioning step results in a physical transformation of the network, for example, changing the states of electronic components forming the network.

At steps 418, 420, and 422, network control element may interact with IoT devices. For example, the network control element(s) may need to establish communications with the IoT devices or verify that the IoT devices are capable of operating within the network.

At step 424, a success or failure of the provisioning step is sent from the network control element to the central location. It will be appreciated that the sending of the outcome of the provisioning process occurs immediately or substantially immediately after success or failure is determined. More specifically, informing the user is not interrupted by other operations or processes that require substantial amounts of time. Although there will be a minimal lag time as information is transmitted across networks, there will be no substantial interruption of this information flow from the network, to the central location, and then to the user electronic device. At step 426, the central location immediately sends this information to the user electronic device where the information is displayed at step 428.

At step 430, subscriber usage information for the IoT devices is collected by the network control element. Subscriber usage information may include monitored days and times of use, and amount of use (e.g., how much data a consumer has used). Various types of electronic devices or elements within the network can sense, measure, or obtain this usage information.

At step 432, this subscriber usage information is sent from the network control element to the central location. The subscriber usage information can be in a number of different formats such as data records. Other examples are possible.

At step 434, the central location reconciles the subscriber usage information with identities of subscribers. For example, with known identities the central location peruses through the subscriber usage information to see how much data a consumer has used, calculates a price for the data usage, and then stores this information in a memory storage device.

At step 436, the reconciliation creates an electronic invoice. The invoice may include information that identifies the customer and information concerning the bill (the amount of the bill and an explanation of the bill). At step 438, the electronic invoice is sent to the customer at the user electronic device.

Figure 5:
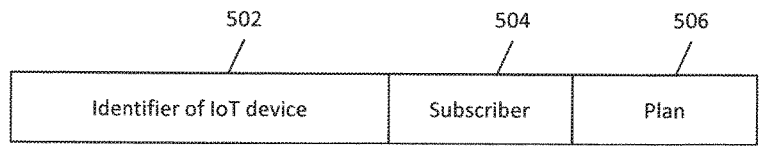
FIG. 5 comprises a diagram as configured in accordance with various embodiments of these teachings.

Referring now to FIG. 5, one example of an entry 502 in a spreadsheet or other type of data structure is described. The entry 502 includes an identification field 504 for the IoT device. This information may be a SIM card part number, a telephone number, an IP address, or a MAC address to mention a few examples.

A subscriber field 504 may indicate a subscriber name. A plan field 506 may indicate a billing plan utilized by the IoT device. Multiple entries are assembled into a data structure such as a spreadsheet. The information may in examples be manually entered by a user.

Figure 6:
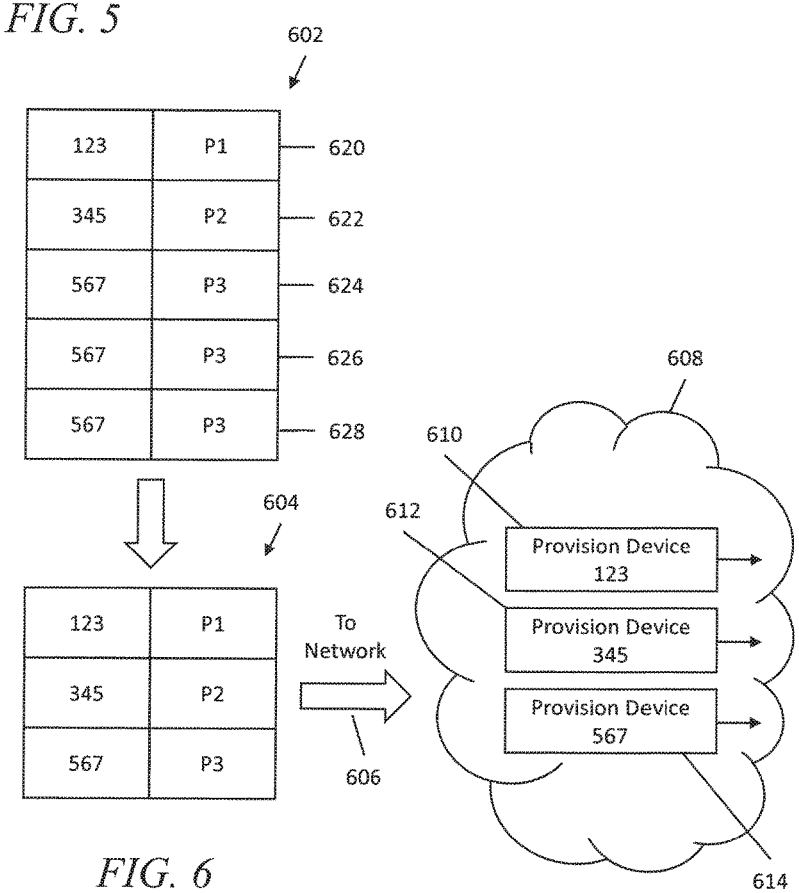
FIG. 6 comprises a flowchart and diagram as configured in accordance with various embodiments of these teachings.

Referring now to FIG. 6, one example of the validation process and the provisioning process is described. In this example, the data structure is a spreadsheet. The spreadsheet may utilize any format such as Excel. An initial spreadsheet 602 includes rows 620, 622, 624, 626, and 628. The first column of each row is an identifier (e.g., 123, 345, or 567). The validation process looks for duplicate entries. In this example, it can be seen that rows 624, 626, and 628 are the same. Consequently, a validated spreadsheet 604 is produced that removes duplicate entries. It will be appreciated that this is one example of a check made by the validation process and that other checks are possible. In addition, it will be understood that the spreadsheet 602 is physically transformed into a validated spreadsheet 604. The validation may be accomplished automatically with a computer program.

At step 606, the validated spreadsheet 604 is sent to the network 608. At the network, a first process 610 provisions the network 608 for operation with IoT device 123 and/or provisions the device 123 for operation with the network 608. A second process 612 provisions the network 608 for operation with IoT device 345 and/or provisions the device 345 for operation the the network 608. A third process 614 provisions the network 608 for operation with IoT device 567 and/or provisions the device 567 for operation with the network 608. By provisioning, it is meant the electronic control or network elements and/or element within the IoT devices are altered, set, modified or programmed such that a particular IoT device can operate within the network.

It will be appreciated that processes 610, 612, and 614 can be performed serially or in parallel (at the same time or overlapping times). In aspects, when performed in parallel advantageously the provisioning can generally be performed more quickly and efficiently.

The batch mode of operation ensures that groups of IoT devices are processed at the same time. In other words, a sequential accessing using multiple operations is not performed. Instead, a single operation or process that accesses information for multiple IoT devices can be used. More specifically, information relating to a group of IoT devices is accessed and information for all these devices retrieved at once from a memory device. Thus, spreadsheet information includes groups of IoT devices that are to be provisioned for operation within the network at the same time. This information can be used in the network to provision the network for all devices in parallel. This particular feature allows for much quicker network operation and efficient system operation.

Figure 7:
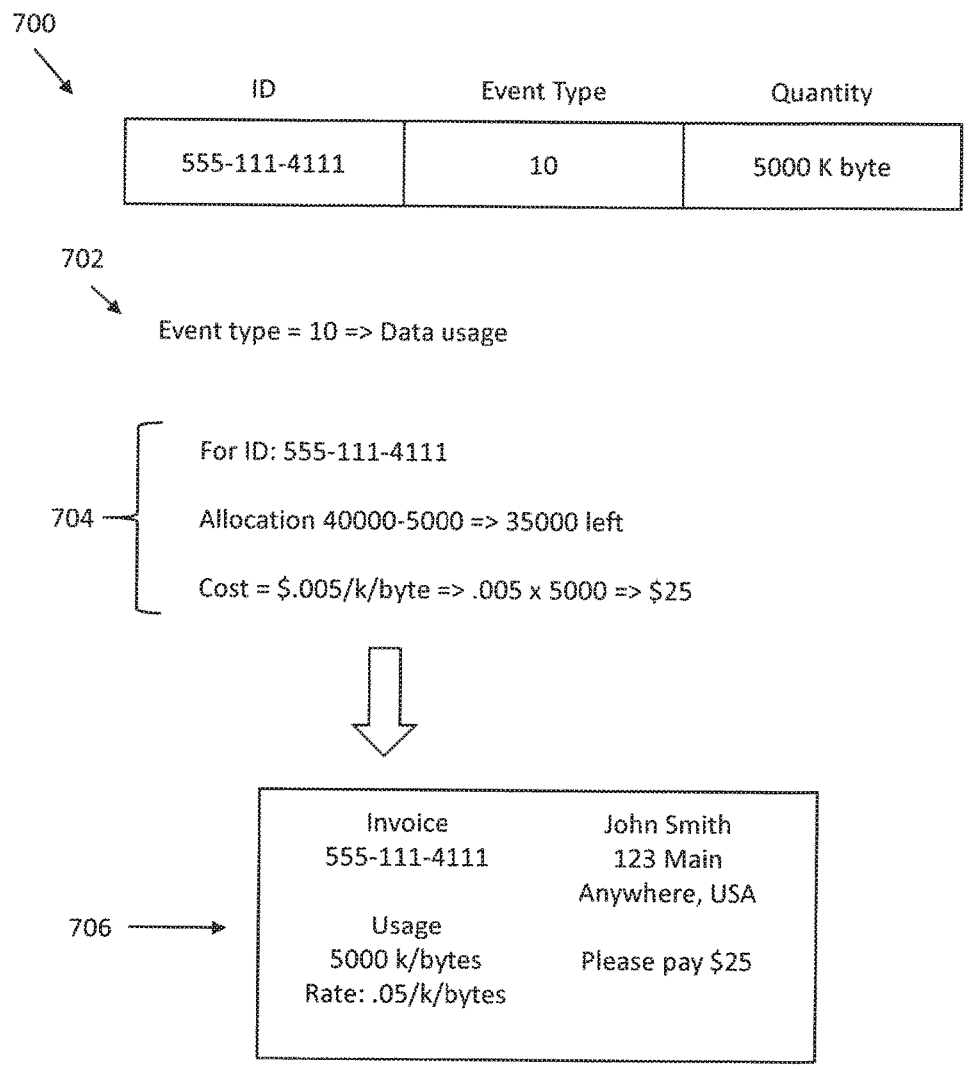
FIG. 7 comprises a flowchart and diagram as configured in accordance with various embodiments of these teachings.

Referring now to FIG. 7, one example of a reconciliation process is described. An entry 700 from subscriber usage information indicates that for a device with identifier 555-111-4111, an event type 10 occurred and a quantity of 5000 k/bytes of information was used.

A table or mapping 702 indicates that event type 10 maps to a data usage by an IoT device. An algorithm 704 is executed that indicates for ID 555-111-4111 an initial allocation of 40000 k/bytes is decreased by 5000 k/bytes (to take into account the usage). A $0.005/k/byte rate is charged for data usage and this rate is multiplied with the 5000 k/bytes of usage resulting in a charge of $25.

An electronic invoice 706 is then created. The electronic invoice 706 includes an identification of the IoT device (555-111-4111), and a user associated with IoT device 555-111-4111 (John Smith) as well as the address of John Smith. The usage information is also presented in the invoice as well as the rate charged for the data usage of the consumer. The electronic invoice 706 can be communicated electronically to the consumer for payment.

It will be appreciated that the various data described is included in appropriate data structures. The organization of the entry 700 is made to facilitate easy access and fast processing resulting in quicker and more efficient operation of a computer when the algorithm 704 is executed on a computer.

The reconciliation operation can be implemented as a batch mode operation ensuring that groups of IoT devices are processed at the same time. In other words, a sequential accessing using multiple operations (one operation for each IoT device) is not performed. Instead, a single operation that accesses information for multiple IoT devices can be used. For instance, information relating to a group of IoT devices is accessed and information for all these devices retrieved at once from a memory device.

Preferred embodiments of this disclosure are described herein, including the best mode known to the inventor(s). It should be understood that the illustrated embodiments are exemplary only and should not be taken as limiting the scope of the appended claims.

What is claimed is:

1. A system that is configured to automatically provision electronic communication networks and invoice customers, the system comprising:
   a first electronic communication network;
   a second electronic communication network;
   a plurality of Internet of Things (IoT) devices configurable to be operated within the second electronic communication network, each of the IoT devices including a sensor, the sensor configured to gather sensed information;
   a user electronic device coupled to the first electronic communication network and located remotely from a central location;
   a transceiver circuit disposed at the central location, the transceiver circuit configured to receive an electronic data structure from the user electronic device via the first electronic communication network, the electronic data structure being an organized list including the plurality of IoT devices operating in an electronic communication network, each of the IoT devices on the list having an identifier;

an electronic memory device disposed at the central location and configured to store the electronic data structure;

a control circuit disposed at the central location, the control circuit configured to:

validate contents of the electronic data structure to transform the electronic data structure into a validated electronic data structure;

upon completion of the validation, immediately and in real-time inform a user of the success or failure of the validation by transmitting a first electronic message from the transceiver circuit to the user electronic device via the first electronic communication network;

subsequently transmit electronic control signals from the transceiver circuit to the second electronic communication network, the control signals provisioning usage of all the IoT devices listed in the validated electronic data structure at the second electronic communication network, and receive an acknowledgment signal from the second electronic communication network indicating success or failure of the provisioning;

upon receiving the acknowledgment signal, immediately and in real-time inform the user of the success or failure of the provisioning by transmitting a second electronic message from the transceiver circuit to the user electronic device;

wherein the second electronic communication network is configured to collect subscriber usage information, the subscriber usage information describing electronic communications made by subscribers operating in or using the second electronic communication network using the IoT devices;

wherein the transceiver circuit is configured to receive and store the subscriber usage information in the electronic memory device;

wherein the control circuit is configured to subsequently reconcile the subscriber usage information and the identification information to form an electronic invoice;

wherein the validation of the data structure, provisioning of the second electronic communication network, and reconciling are performed at least in part by accessing the electronic memory device according to a batch mode of operation that accesses information of multiple IoT devices via a single electronic operation or process.

2. The system of claim 1, wherein the identifier is an IP address, a MAC address, or an alphanumeric identifier.

3. The system of claim 1, wherein at least some of the IoT devices comprise a subscriber identification module (SIM) card in a mobile electronic device.

4. The system of claim 1, wherein the first electronic communication network comprises a wireless network.

5. The system of claim 1, wherein the second electronic communication network comprises the internet.

6. The system of claim 1, wherein the data structure comprises an organized spreadsheet.

7. The system of claim 6, wherein the spreadsheet is downloaded to the user by the control circuit and the user fills in the spreadsheet with the list of the plurality IoT devices.

8. An electronic tool that is configured to automatically provision electronic communication networks and invoice customers, the tool comprising:

a transceiver circuit disposed at a central location, the transceiver circuit configured to receive an electronic data structure from a user electronic device via a first electronic communication network, the user electronic device being coupled to the first electronic communication network and located remotely from the central location, the electronic data structure being an organized list of a plurality of Internet of Things (IoT) devices operating in an electronic communication network, each of the IoT devices on the list having an identifier;

an electronic memory device disposed at the central location and configured to store the electronic data structure;

a control circuit disposed at the central location, the control circuit configured to:

validate contents of the electronic data structure to transform the electronic data structure into a validated electronic data structure;

upon completion of the validation, immediately and in real-time inform a user of the success or failure of the validation by transmitting a first electronic message from the transceiver circuit to the user electronic device via the first electronic communication network;

subsequently transmit electronic control signals from the transceiver circuit to a second electronic communication network, the control signals provisioning usage of all the IoT devices listed in the validated electronic data structure at the second electronic communication network, and receive an acknowledgment signal from the second electronic communication network indicating success or failure of the provisioning;

upon receiving the acknowledgment signal, immediately and in real-time informing the user of the success or failure of the provisioning by transmitting a second electronic message from the transceiver circuit to the user electronic device;

wherein the second electronic communication network is configured to collect subscriber usage information, the subscriber usage information describing electronic communications made by subscribers operating in or using the second electronic communication network using the IoT devices;

wherein the transceiver circuit is configured to receive and store the subscriber usage information in the electronic memory device;

wherein the control circuit is configured to subsequently reconcile the subscriber usage information and the identification information to form an electronic invoice;

wherein the validation of the data structure, provisioning of the second electronic communication network, and reconciling are performed at least in part by accessing the electronic memory device according to a batch mode of operation that accesses information of multiple IoT devices via a single electronic operation or process.

9. The electronic tool of claim 8, wherein the identifier is an IP address, a MAC address, or an alphanumeric identifier.

10. The electronic tool of claim 8, wherein at least some of the IoT devices comprise a subscriber identification module (SIM) card in a mobile electronic device.

11. The electronic tool of claim 8, wherein the first electronic communication network comprises a wireless network.

12. The electronic tool of claim 8, wherein the second electronic communication network comprises the internet.

13. The electronic tool of claim 8, wherein the data structure comprises an organized spreadsheet.

14. The electronic tool of claim 13, wherein the spreadsheet is downloaded to the user by the control circuit and the user fills in the spreadsheet with the list of the plurality IoT devices.

15. A method for automatically provisioning an electronic communication network and invoicing customers, the method comprising:
- at a central location, receiving an electronic data structure, the electronic data structure being an organized list including a plurality of Internet of Things (IoT) devices operating in an electronic communication network, each of the IoT devices on the list having an identifier;
- storing the electronic data structure in an electronic memory device at the central location;
- at the central location, validating contents of the electronic data structure to transform the electronic data structure into a validated electronic data structure;
- upon completion of the validating, immediately and in real-time informing a user of the success or failure of the validating by transmitting a first electronic message from the central location to a user electronic interface located remotely from the central location;
- from the central location, subsequently transmitting electronic control signals to the electronic communication network, the control signals provisioning usage of all the IoT devices listed in the validated electronic data structure at the electronic communication network, and receiving an acknowledgment signal from the electronic communication network indicating success or failure of the provisioning;
- upon receiving the acknowledgment signal, immediately and in real-time informing the user of the success or failure of the provisioning by transmitting a second electronic message for the central location to the user device;
- collecting subscriber usage information at the electronic communication network, the subscriber usage information describing electronic communications made by the subscribers operating in or using the electronic communication network using the IoT devices;
- receiving and storing the subscriber usage information in the electronic memory device at the central location;
- at the central location, subsequently reconciling the subscriber usage information and the identification information to form an electronic invoice;
- wherein the validating, provisioning, and reconciling are performed at least in part by accessing the electronic memory device according to a batch mode of operation that accesses information of multiple IoT devices via a single electronic operation or process.

16. The method of claim 15, wherein the identifier is an IP address, a MAC address, or an alphanumeric identifier.

17. The method of claim 15, wherein the IoT device comprises a subscriber identification module (SIM) card in a mobile electronic device.

18. The method of claim 15, wherein the electronic communication network comprises a wireless network.

19. The method of claim 15, wherein the data structure comprises an organized spreadsheet.

20. The method of claim 19, wherein the spreadsheet is downloaded to the user and the user fills in the spreadsheet with the list of the plurality IoT devices.

* * * * *